Patented Sept. 13, 1927.

1,642,347

UNITED STATES PATENT OFFICE.

HARRY M. WILLIAMS AND ALFRED L. BOEGEHOLD, OF DAYTON, OHIO, ASSIGNORS TO GENERAL MOTORS RESEARCH CORPORATION, OF DAYTON, OHIO, A CORPORATION OF DELAWARE.

BEARING.

No Drawing.    Application filed August 17, 1922. Serial No. 582,550.

The present invention relates to materials particularly suitable for bushings and bearings and also to processes of making such materials. In the referred form of embodiment it relates particularly to bushings, bearings or other coherent bodies intended to be used in rubbing contact with a relatively moving member which are often referred to as self-lubricating and for which it is often claimed that they can be operated without lubrication from external sources. It is intended that the term bearings as used herein shall include metallic members in rubbing contact with other relatively moving members.

The objects of the invention include a bushing or bearing or the like capable of containing within itself a large reserve supply of lubricant which lubricant is applied uniformly to the sliding surfaces.

Another object is a bushing or like member of this character that will permit replenishing this reserve from external sources.

Still another object is a bushing or member of this character made of a material that will withstand high bearing pressures, having machinability, a low coefficient of friction, toughness and ductility.

A further object is an efficient and economical process of producing such materials and the formation therefrom of such bushings or like members.

In the preferred form of embodiment of the invention the material is a coherent body of highly porous metallic alloy structure, having a low coefficient of friction and a high crushing strength combined with the properties of toughness, ductility and machinability.

The porosity is due to the existence of a large number of minute voids in the metal structure. In other words, the material is a minutely cellular coherent structure whose cells are microscopic in size and are intercommunicating and whose walls are of bearing metal, for example, bronze.

The high crushing strength and other properties mentioned are functions of the alloy formed and will vary therewith and with modifications in the process of production.

An example of the crushing strength that has been found is about 75,000 lbs. per sq. in.

Such a material as has just been mentioned admits of great possibilities from the standpoint of lubrication. It readily takes up large quantities of oil which it gives up to the bearing surface only as needed. (Satisfactory bushings having an oil absorption up to 17% have been made.) It may be impregnated with any lubricant suitable for the specific requirements of the service in which the bushing or bearing is to be used. For example, for this purpose may be used any liquid lubricant or lubricant which is solid at normal atmospheric temperatures but which melts at slightly elevated temperatures, such as stearic acid, petroleum jelly, soaps, etc.; or a material such as that marketed under the trade name of "Oildag" which will supply to the bearing surface both oil and lubricating graphite in suspension. ("Oildag" is broadly a suspension of graphite in oil.)

Impregnation with "Aquadag" followed by a drying operation also gives good results. ("Aquadag" is broadly a suspension of graphite in water.)

Materials such as above described and which form part of the invention herein claimed may be produced in the following manner.

Metals in a fine state of subdivision are first mixed together and with a small proportion of a material which will volatilize, sublime, or otherwise separate from the metallic mass in a subsequent heating and which will have no deleterious effect on the other constituents or on the product. This mixture is then compressed in suitable dies to form a coherent mass of the desired shape and the formed articles subjected to heating under suitable conditions to cause the metals to diffuse or alloy together and the volatile material to be driven out. The heating should be at least high enough to facilitate the alloying, but need not be high enough to melt all of the metals.

A specific example of the proportions used for a bearing bushing is as follows:

| | Parts. |
|---|---|
| Copper | 90 |
| Tin | 10 |
| Salicylic acid | 6 |

It has been found that good results are obtained if these materials in a state of division fine enough to pass a 200 mesh screen, are intimately mixed in any suitable fashion and compressed in a die of the desired form under very high pressure, for example 80,000 lbs. per sq. in. The formed article is then heated in a non-oxidizing atmosphere for a sufficient period to cause the desired alloying. When heating at say 675° C., which has been found a satisfactory temperature, a period of about 3 hours has produced a satisfactory product although longer heating is not objectionable. The time of heating at this temperature will usually be from 3 to 6 hours although even longer perriods are not detrimental. If, however, the temperature is increased, the time may be materially shortened.

The bushing is then allowed to cool, and may be machined to size by reaming or other convenient method and impregnated with lubricant and is then ready for installation.

The method to be used for impregnating the bushing may be any of the ordinary methods of impregnating porous materials. Good results have been obtained by heating the bushings in oil and allowing them to cool therein and also by well known vacuum and pressure methods.

The process is quite well adapted for the production of bearings of many different compositions by varying the several factors of composition, briquetting pressure, temperature and time.

Graphite may also be used and a typical mixture containing this material is:

| | Parts. |
|---|---|
| Copper | 90 |
| Tin | 10 |
| Graphite | 6 |
| Salicylic acid | 2 to 4 |

For a softer bearing material, the composition may contain lead. Bearings have been produced having up to thirty-two to thirty-three percent (32-33%) of lead. For example:

| | Parts. |
|---|---|
| Copper | 60 |
| Tin | 5 |
| Lead | 35 |
| Graphite | 6 |
| Salicylic acid | 4 |

In order to control the degree of porosity of the body produced according to this invention, volatile organic substances such as benzoic acid or naphthalene may be substituted for salicylic acid. The volatile organic substances of this character do not react with the metallic particles of the body under heat treatment, and therefore do not oxidize or corrode the particles.

By carrying out the above processes, there is produced a material which consists of a minutely cellular structure of an alloy which has high compressive strength, ductility, porosity and machinability, and one which is easily and economically produced.

While the above description shows the preferred form of embodiment of the invention it should be understood that variations may be made therein without departing from the scope of the claims which follow.

What we claim is as follows:

1. The process which comprises intimately mixing finely divided copper, tin, and salicylic acid; compressing the mixture into the desired form under a pressure of about 80,000 lbs. per sq. in., and heating the resultant formed article to about 675° C. in a non-oxidizing atmosphere.

2. The process of making bearings which comprises intimately mixing finely divided bearing metal constituents with salicylic acid; compressing into the desired form; and heating to drive out the acid and facilitate alloying of the said constituents.

3. The process of producing a porous body which comprises, compressing a mass of finely divided, metallic, alloyable ingredients mingled with a finely divided, completely volatile organic substance, then heat treating the mass sufficiently to cause the metallic ingredients to alloy with each other and also to effect removal of said organic volatile substance.

In testimony whereof we hereto affix our signatures.

HARRY M. WILLIAMS.
ALFRED L. BOEGEHOLD.